Patented Oct. 16, 1923.

1,471,108

UNITED STATES PATENT OFFICE.

SAMUEL DAVIES, OF BRITON FERRY, WALES.

TIN-PLATE BRANNING OR GREASE-REMOVING MACHINE.

Application filed September 5, 1922. Serial No. 586,384.

*To all whom it may concern:*

Be it known that I, SAMUEL DAVIES, a subject of the King of Great Britain, residing at No. 1 Alexander Road, Briton Ferry, in the county of Glamorganshire, Wales, have invented certain new and useful Improvements in and Connected with Tin-Plate Branning or Grease-Removing Machines, of which the following is a specification.

This invention relates to improvements in and connected with branning or grease removing machines used in the manufacture of tin plates. The principal object of the invention is to provide a simple construction of such machine adapted to treat plates of various sizes without causing the same to become scratched on their surfaces or to have their edges injured or buckled as happens when the plate is pushed through the branning or cleaning material.

According to this invention, the plates are supported and conducted through the branning machine by an endless travelling inclined belt adapted for bringing the surfaces of the plate into intimate contact with the branning material. At an intermediate point in the upper run of the belt, plate reversing means are provided, such means being adapted for reversing the plates side for side during their travel in connection with the belt. Preferably, one side of a plate is treated with the branning material while the top run of the belt travels from a lower belt drum to about midway between the said drum and an upper belt drum. At this midway position the plate is reversed while still in contact with the belt, so that during the continued travel of the belt to the upper belt drum, the side of the plate which previously faced the belt is then presented uppermost to the action of the branning material. Curved guide means are provided in connection with the upper run of the belt and are adapted for imparting two successive concavities or troughs to such upper run, the plate reversing means being situated at the crest between the two concavities or troughs. Preferably, these guide means consist of two idler wheels or the like in contact with the belt. Owing to the formation imparted to the upper run of the belt, the branning material is raised by the latter and then falls by gravity on to the said plates, the branning material in this manner being automatically agitated or mixed as well as effectively passed on to the plates for cleaning the surfaces thereof.

The invention will be fully described with reference to the accompanying drawings, in which:—

Figure 1:
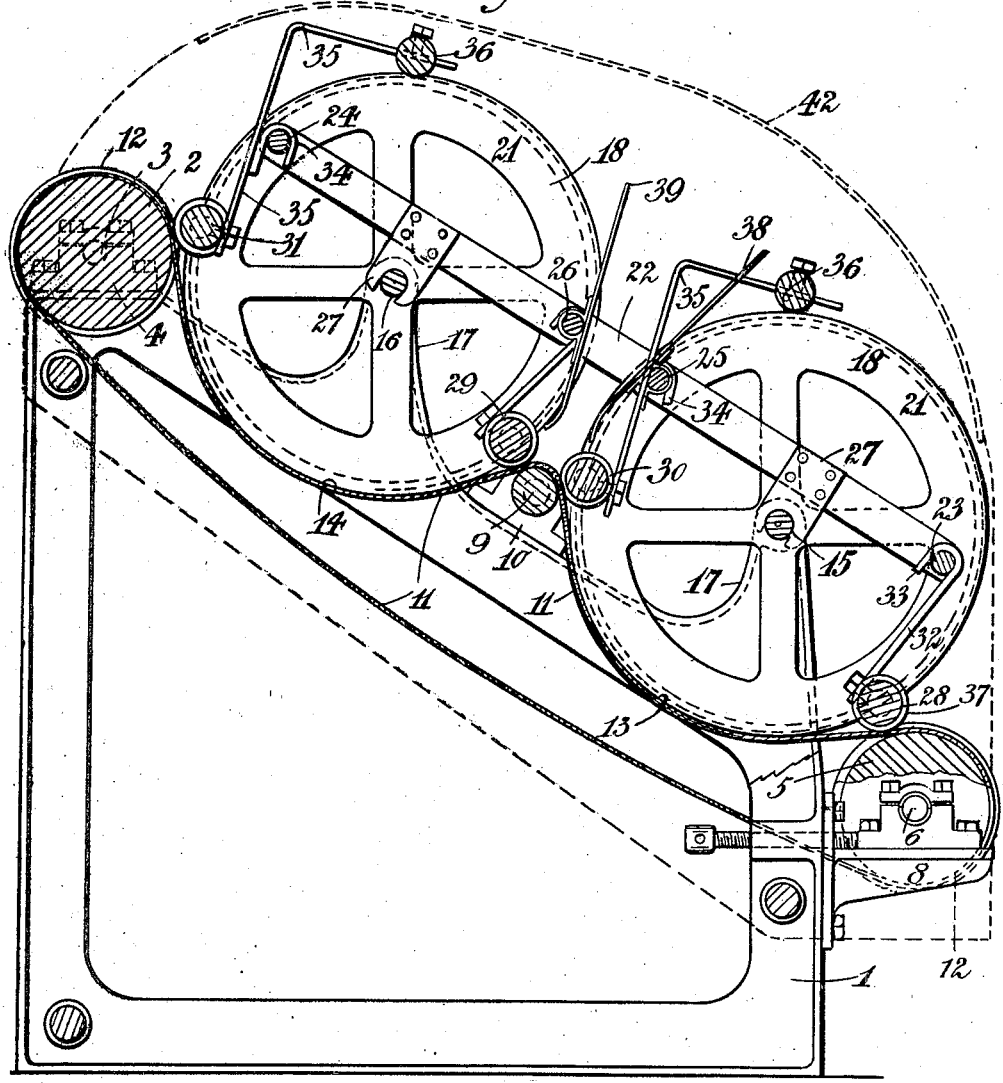
Figure 1 is a longitudinal section partly in elevation of an example of construction of machine according to this invention.
Figure 2:
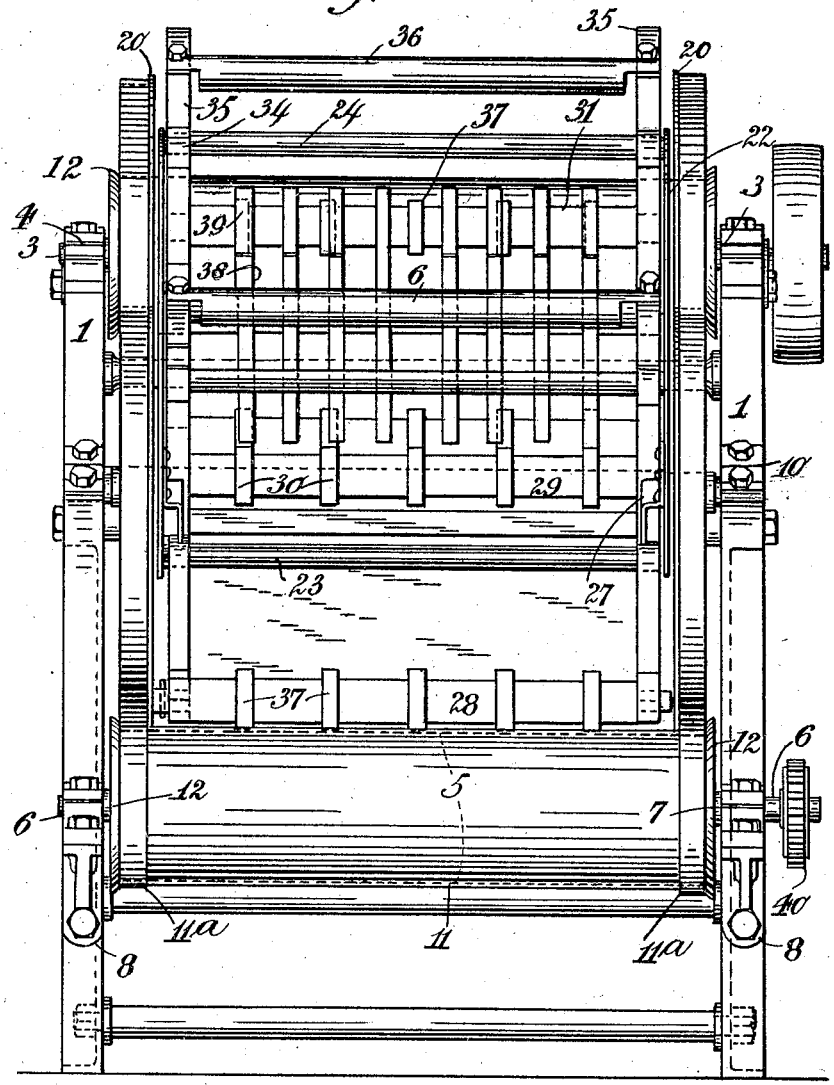
Figure 2 is a front elevation.

The machine comprises two side frames 1, connected by suitably arranged transverse members, the said side frames being so constructed that their upper surfaces are inclined upwardly from the front to the rear ends thereof.

Extending between the side frames 1 near the upper and rear end thereof, is a rear belt drum 2 fixed on a spindle 3 supported at opposite ends in bearings 4 on the appropriate side frames. A similar drum 5 is arranged extending between the forward end of the side frames, the spindle 6 of which drum is parallel with the spindle 3 of the drum 2 and is carried in bearings 7 which are preferably adjustable on the side frames 1 or on brackets 8 connected thereto, towards and away from the rear belt drum 2. The belt drum 2 is adapted to be driven in any suitable manner, as for instance by a driving belt passing over a pulley fixed to the outer end of the spindle 3. About midway between the rear and forward belt drums 2 and 5 respectively, there is a belt supporting and guiding roller 9 freely rotatable in bearings 10 on the side frames.

Passing over the drums 2 and 5 and the guiding roller 9 is an endless belt 11, and of such a width as to extend practically the whole length of the said drums. In order to retain the belt 11 in correct position on the said drums, the latter are each provided at opposite ends with a preferably metal disc 12 extending beyond the periphery of the drum and having its edge curved outwardly to prevent any likelihood of the belt riding over the periphery of the disc, while the tension of the belt can be regulated by adjusting the position of the bearings 7 of the front belt drum 5.

The belt 11 is of such a length as to enable its upper run which is driven by the belt drum 2 in an upward direction, to take the form of two transversely extending parallel troughs 13 and 14, into which branning or cleaning material is placed. The lower or forward trough 13 is formed between the forward belt drum 5 and the belt supporting roller 9 and the upper or rearward trough 14 is formed between the said roller 9 and the rear belt drum 2.

In order to form these troughs 13 and 14 in the belt 11, there are provided above the belt two transverse spindles 15 and 16, fixed at their opposite ends in upwardly extending projections 17 on the side frames 1. On each of these spindles 15 and 16 a pair of guiding wheels or idle pulleys 18 is provided and freely rotatable thereon. The idle pulleys of each pair are arranged near the opposite ends of the spindles in such a position that they bear upon the upper surface of the belt 11 at side edges thereof. Movement along the spindles of the idle pulleys 18 is prevented in any suitable manner, as for instance, by providing collars 19 fixed to the spindles on the opposite sides of the said idle pulleys, see Figure 3.

The spindle 15 is located in such a position and the wheels or idle pulleys 18 thereon, are of such a diameter that the said pulleys depress the belt 11 between the forward belt drum 5 and the supporting roller 9, thereby forming the forward trough 13, while the spindle 16 and the wheels or idle pulleys 18 thereon, are so arranged and constructed that the said pulleys cause the belt to take the form of the rear trough 14.

Figure 3:
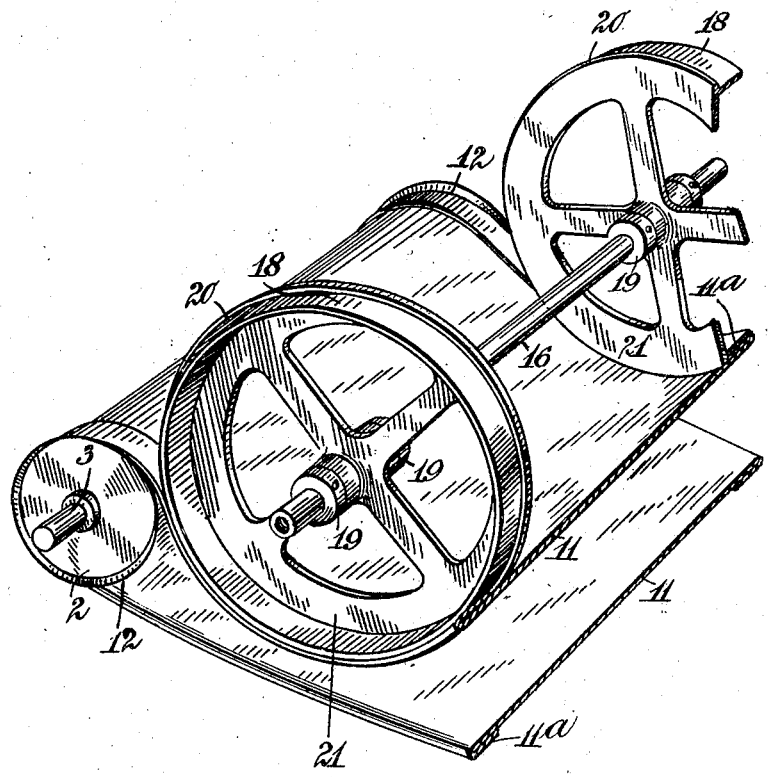
Figure 3 is a perspective view showing one pair of guiding wheels forming the rear trough and the rear belt drum with the belt in section.

The outer surface of the belt 11 is, at its side edges, preferably formed of double thickness as shown at 11$^a$ Figure 3 and the periphery of guide wheels or idle pulleys 18 bears upon this thickened portion.

Each wheel 18 is formed on its inner edge with a peripheral flange 20 against which the inner edge of the thickened portion 11$^a$ bears, so that any bellying of the belt between its sides, due to the weight of the branning or cleaning material contained in the trough is prevented.

To form a closure to the opposite ends of the troughs at the sides of the belt 11, the inner sides of the wheels or idle pulleys 18 are each disk like, with apertures formed therein to decrease its weight, but having a substantially inwardly extending radial flange or surface 21 which prevents branning or cleaning material from falling out of the ends of the troughs.

Arranged above the belt 11 and preferably removably supported by the spindles 15 and 16 and between the guide wheels or idle pulleys 18, is a metal frame 22 comprising two longitudinal side members connected at their forward and rearward ends by transverse round rods 23 and 24 respectively. Similar rods 25 and 26 are arranged towards the centre of the said side members. Depending from each side member are two lugs or brackets 27, forked at their lower ends and adapted to straddle the spindles 15 and 16. The collars 19 fixed to the spindles at the inner sides of the pulleys 18, form stops to the movement of the brackets 27 along the said spindles and thus retain the frame centrally between the guide wheels or idle pulleys 18.

28, 29, 30 and 31 are pressure rollers which are adapted to bear lightly on the surface of the belt 11. The roller 28 is adapted to bear on the belt 11 somewhat rearwardly of the axis of the lower or forward belt drum 5 and the roller 29 is adapted to bear in a similar manner on the belt, at a position somewhat rearwardly of the axis of the belt supporting roller 9.

These rollers 28 and 29 are each revolubly carried at their opposite ends in bearings at the lower ends of arms 32. The upper ends of these arms are hooked, as at 33, by which means the arms carrying the roller 28 are freely suspended from the transverse rod 23 of the frame 22 and the arms carrying the roller 29 are likewise suspended from the transverse rod 26, the arrangement being such that the weight of the rollers and their supporting arms causes the said rollers to bear upon the belt 11 at the desired part.

The rollers 30 and 31 are similarly suspended from the transverse rods 25 and 24 respectively, by means of hooks 34 connected to arms 35. In these instances the arms 35 extend above their point of suspension and are bent forwardly. The arms of each pair are connected at their forward ends by a transverse rod or bar 36 which forms a counterweight to force the roller in a rearward direction on to the belt 11, the counterweight being preferably adjustable on the arms 35 so that the pressure of the rollers 30 and 31 on the belt 11 can be regulated.

India rubber or like resilient rings 37 are preferably provided at intervals along the length of each pressure roller 28, 29, 30 and 31. The said rings project beyond the periphery of the roller and are adapted to bear upon the surface of the plate and thus prevent the scratching of the surface thereof.

38 and 39 are plate guiding grids which are fixed on to the spindles 25 and 26 respectively and are adapted to reverse the plate side for side during its traverse through the machine, so that the branning or cleaning material acts first on one side of the plate and then on the other side thereof.

In the operation of the machine, constructed as herein described, the plates to be treated are passed on to the upper surface of the travelling belt 11 above the lower belt drum 5 which forms one side of the first trough 13, suitable means, such for instance as an endless conveyor, which may be driven by means of a chain passing over a sprocket wheel 40 on the spindle 6 of the belt drum 5, being preferably employed to feed the plates on to the belt. At this part, the belt 11 assumes a substantially horizontal or slightly downwardly inclined surface. Here the plates pass under the first pressure roller 28 and are carried by the belt 11 which then takes the form of a trough 13 by passing under the first pair of pulleys 18. During its passage on the belt 11 each plate is (on one side) subjected to the action of the branning or cleaning material which is continuously being raised by the travelling belt 11 and falls by gravity on to the plate. When the plate reaches the upper side of the first trough 13, which extends in a substantially vertical plane, it passes under the second pressure roller 30 and is thereby directed upwardly and outwardly from the belt, its upper or leading edge passing between the guiding grids 38 and 39 and in contact with the rear grids 39 until the plate has passed from the said pressure roller 30. The opposite edge of the plate is then in edge contact with the belt 11 and is thereby drawn into such a position that its upper or leading end falls forwardly on to the front guiding grid 38 by which the plate is directed, passes under the third pressure roller 29 and into the second trough 14. During its transference from the first trough 13 to the second trough 14 the side of the plate presented uppermost is reversed so that the opposite side of the plate is subjected to the action of branning or cleaning material in the second trough 14 in the same manner as described with reference to the first trough. When the plate reaches the upper side of the second trough 14 it passes under the pressure roller 31 and the plate then having been treated on both sides by the branning or cleaning material is then discharged from the machine.

In this machine, it will be seen that the plates are supported throughout their treatment on a travelling belt, so that there is no sliding of the plates in the troughs and as the pressure rollers simply roll upon the surfaces of the plates the latter are not injured by scratching.

Very little dust is created by the operation of this machine and such dust as is created may be prevented from flying about by means of covers such as indicated by dotted line 42 in Figure 1 comprising suitably shaped and connected metal sheets attached to the frame of the machine or otherwise supported so as to cover in the top and sides of the open troughs, or may be to enclose the whole machine, provision being made to enable the supply to and removal of the plates from the machine.

I claim:—

1. A machine for branning or removing grease from tin plates, comprising an endless inclined travelling belt of a greater width than the plates to be branned and for conveying said plates through the machine, means for driving said belt so that its upper run travels in an upward direction, and guiding means for forming the upper run into two successive troughs to receive branning or cleaning material, through which troughs the plates are carried by said belt sustantially as set forth.

2. A machine for branning or removing grease from tin plates, comprising an endless inclined travelling belt by which said plates are conveyed through said machine, an upper and a lower belt drum around which said belt passes, means for driving said belt so that its upper run moves in an upward direction, supporting means for said upper run at a point intermediate of said belt drums, and means for depressing said belt between said belt drums and said supporting means to form the said upper run into two successive troughs for receiving branning or cleaning material through which troughs the plates are carried by said belt and subjected to treatment by branning material in said troughs substantially as set forth.

3. A machine for branning or removing grease from tin plates, comprising an endless inclined belt to convey said plates through the machine, an upper and a lower belt drum around which drums the belt passes, means for supporting the upper run of said belt at a position intermediate of said belt drums, a pair of idle pulleys or wheels rotatably supported above said belt and adapted to bear one on each edge of the belt to depress said belt between said supporting means and upper belt drum to form an upper transverse trough, a second pair of idle pulleys or wheels rotatably supported above said belt and adapted to bear one on each edge of the belt between said supporting means and said lower belt drum to form a lower transverse trough said troughs being adapted to contain the branning material, means for driving said belt so that its upper run moves in an upward direction and yielding pressure means for retaining the plates in contact with the belt whilst entering and leaving the trough-like portions thereof substantially as set forth.

4. A machine for branning or removing grease from tin plates comprising an endless inclined traveling belt adapted to support the plates to be treated, means for forming the upper run into two parallel successive troughs, to contain the branning or cleaning material, means for driving the upper run of the belt in an upward direction and plate reversing means located above the crest between the two troughs substantially as and for the purpose set forth.

5. A machine for branning or removing grease from tin plates comprising an inclined traveling belt for conveying said plates through said machine said belt having thickened side edges on its outer surface, an upper and a lower belt drum around which drums the belt passes, means for driving said belt so that its upper run travels upwardly a transverse revoluble roller to support the upper run of the belt at a point mid-way or approximately mid-way between said drums, guide wheels or idle pulleys revolubly carried on spindles above said belt and adapted to bear upon said belt between said upper and lower belt drums and the transverse supporting roller to form the upper run of the belt into two transverse troughs, outwardly extending flanges on the inner sides of said pulleys, with which flanges the inner edges of the thickened side edges of the belt contact and inwardly extending flanges on said pulleys to form closures to the ends of the troughs substantially as set forth.

6. A machine for branning or removing grease from tin plates, comprising an inclined endless travelling belt adapted to convey said plates through the machine, an upper and a lower belt drum around which drums the belt passes, means for driving the said belt so that its upper run travels in an upward direction, a rotatable roller to support said upper run at a position intermediate of said belt drums, a spindle mounted above said belt between the upper belt drum and said supporting roller a second spindle mounted above said belt between the lower belt drum and said supporting roller, a pair of wheels or idle pulleys revolubly mounted on each of said spindles and adapted to form the belt into two parallel transverse troughs to contain the branning or cleaning material, a frame supported by said spindles, pressure rollers carried by said frame and adapted to yieldingly press the plates on to said belt and plate reversing means on said frame located above said supporting roller substantially as and for the purpose specified.

7. A machine for branning or removing grease from tin plates comprising an endless inclined belt adapted to convey the plates through the machine means for driving the belt so that its upper run travels in an upward direction, means for forming said upper run into two parallel troughs to contain branning or cleaning material, means for pressing said plates on to said belt and means for reversing the plates side for side while being taken through the machine on said belt substantially as set forth.

8. A machine for branning or removing grease from tin plates, comprising an endless inclined belt adapted to convey the plates through the machine, means for driving the belt so that its upper run travels in an upward direction, gravity operated rollers provided with resilient rings to bear upon the plates and press the said plates into contact with said belt and means to reverse the plates side for side during their conveyance through the machine so that the opposite sides of the plates are successively treated by branning material carried by said belt substantially as set forth.

9. A machine for branning or removing grease from tin plates, comprising an endless inclined plate supporting belt adapted to be driven so that its upper run travels in an upward direction, means for forming the upper run into two parallel transverse troughs, means for closing the ends of said troughs to retain branning or cleaning material therein, pressure means to yieldingly force said plates into contact with said belt when entering and leaving said troughs and plate reversing means located above and between said troughs and adapted to reverse said plates side for side while supported by said belt substantially as set forth.

10. Tin plate branner, comprising a wide conveyor belt, inclined supports for said conveyor, driving means adapted to drive said belt so that its upper run travels upwardly, and guide means adapted for forming a concavity in the upper run of said belt whereby bran contained in said concavity will cascade on to conveyed plates substantially as set forth.

SAMUEL DAVIES.